United States Patent
Xia et al.

(10) Patent No.: US 7,126,644 B2
(45) Date of Patent: Oct. 24, 2006

(54) RAPID WHITE BALANCE METHOD FOR COLOR DIGITAL IMAGES

(75) Inventors: Yi-Shen Xia, Beijing (CN); Po-Chiang Yeh, Beijing (CN); Rui-Jing Dong, Beijing (CN)

(73) Assignee: Destiny Technology Corporation, Taipei (TW)

(*) Notice: Subject to any disclaimer, the term of this patent is extended or adjusted under 35 U.S.C. 154(b) by 611 days.

(21) Appl. No.: 10/613,110

(22) Filed: Jul. 7, 2003

(65) Prior Publication Data
US 2005/0007463 A1    Jan. 13, 2005

(51) Int. Cl.
*H04N 9/73*    (2006.01)
(52) U.S. Cl. ..................................... 348/655
(58) Field of Classification Search ............... 348/655, 348/656, 223.1, 687, 690, 603, 379; 382/167
See application file for complete search history.

(56) References Cited

U.S. PATENT DOCUMENTS

| | | | | |
|---|---|---|---|---|
| 5,293,224 A | * | 3/1994 | Ajima | 348/656 |
| 5,298,979 A | * | 3/1994 | Kim | 348/655 |
| 5,461,429 A | * | 10/1995 | Konishi et al. | 348/656 |
| 5,493,342 A | * | 2/1996 | Naito et al. | 348/656 |
| 5,526,059 A | * | 6/1996 | Lee et al. | 348/655 |
| 5,550,587 A | * | 8/1996 | Miyadera | 348/223.1 |
| 5,659,357 A | * | 8/1997 | Miyano | 348/223.1 |
| 5,663,770 A | * | 9/1997 | Yamade | 348/656 |
| 6,097,445 A | * | 8/2000 | Goto et al. | 348/655 |
| 6,249,323 B1 | * | 6/2001 | Van Der Voort | 348/655 |
| 6,429,905 B1 | * | 8/2002 | Yamamoto | 348/656 |
| 6,437,833 B1 | * | 8/2002 | Tagomori et al. | 348/657 |
| 6,505,002 B1 | * | 1/2003 | Fields | 396/287 |
| 6,529,247 B1 | * | 3/2003 | Tagomori et al. | 348/657 |
| 6,710,821 B1 | * | 3/2004 | Osawa et al. | 348/656 |
| 2002/0101516 A1 | * | 8/2002 | Ikeda | 348/223 |
| 2003/0011686 A1 | * | 1/2003 | Higuchi | 348/223.1 |
| 2003/0052978 A1 | * | 3/2003 | Kehtarnavaz et al. | 348/223.1 |

* cited by examiner

*Primary Examiner*—Paulos M. Natnael
(74) *Attorney, Agent, or Firm*—Rabin & Berdo, P.C.

(57) ABSTRACT

A rapid white balance method for color digital image is disclosed. This method is applied to RGB color regions in an image. First, the image is divided into several blocks to obtain the G parameter, then the averaged R and B parameters of each block, thereby obtaining the R and B parameters of the whole image. Using the R and B parameters, the method obtains an R gain and a B gain. Finally, the image is adjusted. The method only uses one RGB value for each pixel. The processing time is reduced, while the quality of the image is increased.

19 Claims, 7 Drawing Sheets
(2 of 7 Drawing Sheet(s) Filed in Color)

RAPID WHITE BALANCE METHOD FOR COLOR DIGITAL IMAGES

BACKGROUND OF THE INVENTION

1. Field of Invention

The invention relates to a white balance method and, in particular, to a white balance process for color digital images.

2. Related Art

Nowadays, there are more and better digital products and coding technologies introduced to the world. The demand of a digital life has become the new driving force for the digital technology to develop toward a wider space. Digital products such as computers, cell phones, video cameras, digital cameras, PDA's are changing our daily life. It is believed that more new digital products will be developed and affect our life in the future. The developments in basic structures and functioning principles of the digital image technology are also subjects that scientists are after.

White balance is a basic function in color digital image equipment. This function defines "white" as "white" no matter how the environmental light changes. When the colors on a real object are recorded using a color sensor, there might be deviations existing between the recorded colors and the actual colors. Only when an appropriate light source with a specific color spectrum exists can the actual colors on the real object be captured. For many sensors, the sunlight is the most appropriate illuminant. When the sunlight shines on a white object, the image captured by the sensor will manifest the actual white color. However, when the same object is in the light produced by artificial white light, the image captured by the sensor tends to be slightly red. This is because the spectrum of the artificial white light has a strong red light component. When using a digital camera without the white balance function, one will discover that the white object under the artificial white light, the image is actually bluish. The image shown in FIG. 1a is obviously bluish. The reason human eyes detect the color as white is because they correct the color. The image after the white balance process will produce a satisfactory effect like FIG. 1b. The conventional AWB algorithm is used in the process by obtaining simulation results by processing a huge amount of test color images. All areas in an image have to be white balance processed. Therefore, it takes a longer processing time. It is based upon the assumption that the composite color of the whole image is white. However, this method cannot process correctly for big monochromic object or background.

SUMMARY OF THE INVENTION

In view of the foregoing, the invention provides a rapid white balance method for color digital images. It reduces the processing while increase the quality of the processed images.

The disclosed method is used for RGB color space in a image. First, the image is divided into a plurality of blocks in order to obtain a reference G parameter, $G_{ref}$. According to the actual division, compute the averaged R valve and the averaged B value, $R_{savg}$ and $B_{savg}$, are extracted to compute the reference R parameter and B parameter, $R_{ref}$ and $B_{ref}$, of the whole image. The reference R parameter and B parameter are then used to compute the R gain, $R_{gain}$, and B gain, $B_{gain}$. A tuning value is obtained from these gain factors. If the tuning value is greater than a threshold, the method starts all over from the beginning to re-divide the image into several blocks. This process repeats until the tuning value falls within a reasonable range.

The disclosed method only processes data in the RGB color space. Other color space are not adjusted. It only uses one RGB value and the processing time is thus reduced. The image quality of the method is superior to most existing AWB algorithms. The invention utilizes dynamical image divisions to avoid the problem associated with monochromic image. It also abandons the unreasonable assumption that the composite color of the whole image should be white.

BRIEF DESCRIPTION OF THE DRAWINGS

The patent or application file contains at least one drawing executed in color. Copies of this patent or patent application publication with color drawing(s) will be provide by the Office upon request and payment of the necessary fee.

The invention will become more fully understood from the detailed description given hereinbelow illustration only, and thus are not limitative of the present invention, and wherein.

DETAILED DESCRIPTION OF THE INVENTION

The action of white balance is similar to the color temperature filters added to the conventional cameras in order to accurately recovering the original colors.

RGB is a color mode of colors. They correspond to the three basic colors, red, green and blue perceived by human vision. R means red, G means green and B means blue. Since each of the three colors has 256 brightness levels, therefore, there are 16.7 million combinations of them. It is thus very natural to use the R, G, and B components to represent colors. Most image-taking devices use the CCD technology to directly detect the R, G, and B components of a color. This makes the three basic color model an important basis of image captures, displays and printing.

Figure 1A:
FIG. 1a is an image that is before white balance adjustment.
Figure 1B:
FIG. 1b is an image that has achieved white balance.
Figure 2:
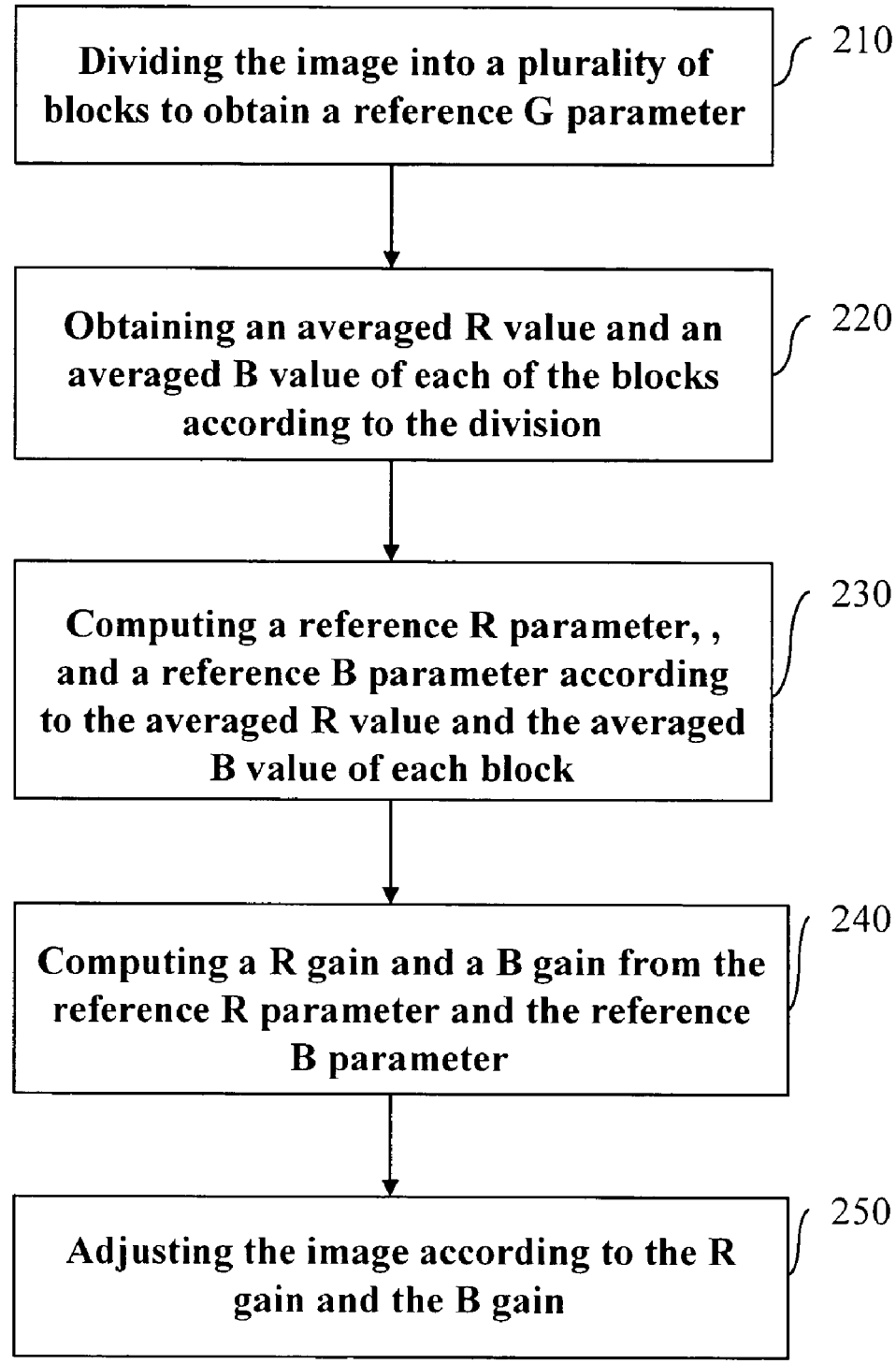
FIG. 2 is a flowchart of the disclosed rapid white balance method for color digital image.

The flowchart of the disclosed method is shown in FIG. 2. First, a image is divided into a plurality of blocks to obtain the reference G parameter (step 210). According to the division, the averaged R and B parameters of each block are obtained (step 220). The averaged R value and averaged B value are used to compute the reference R and B parameters of the image (step 230). An R gain and a B gain are calculated from the reference R parameter and the reference B parameter, respectively (step 240). Finally, the image is adjusted according to the R gain and the B gain (step 250).

Figure 3:
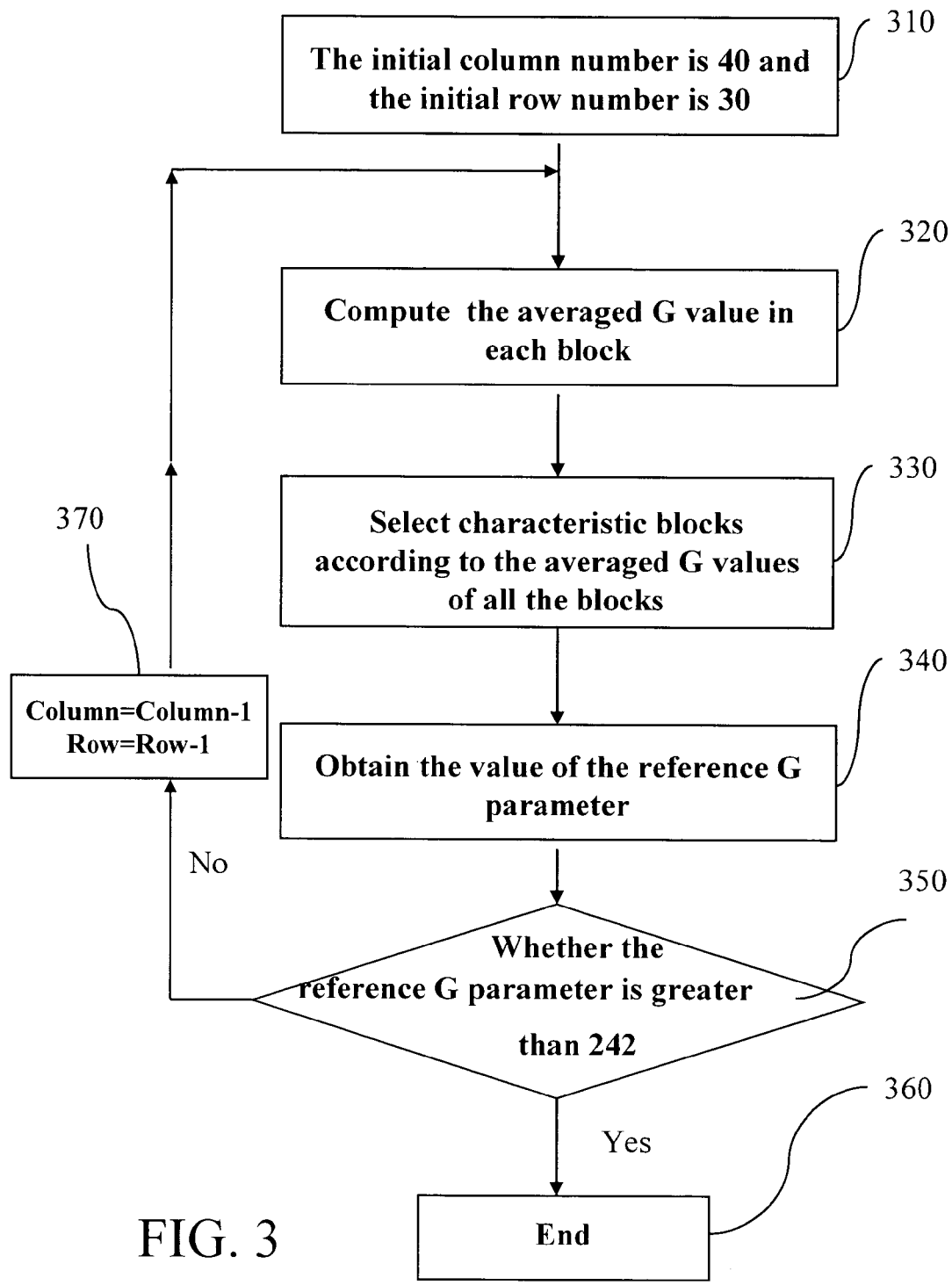
FIG. 3 is a flowchart of dividing an image according to the invention.

In the RGB color space, the G parameter has the largest brightness contribution to the image. When R and B parameters are 0, the image is still visible. Therefore, we use the G parameter, $G_{ref}$, as a reference parameter to divide the image (FIG. 3). First, a set of initial row and column numbers is determined to divide the image into blocks. The initial column number is 40 and the initial row number is 30 (step 310). In other words the image is divided into 40*30 blocks of equal size. We know that the sensor can obtain the R, G, and B values in each pixel. With this information, the averaged R ($R_{savg}$), G ($G_{savg}$), and B ($B_{savg}$) values in each block can be computed. The R value, B value and G value of the whole image is respectively named R reference, B reference and G reference. In order to obtain a reasonable division, the averaged G value, $G_{savg}$, in each block is computed (step 320). Several characteristic blocks are selected according to the averaged G values of all the blocks (step 330). The characteristic blocks refer to those representative ones. The objective is to obtain the G parameter from these characteristic blocks. Here we choose the blocks with the top 10% averaged G values to be the characteristic blocks and the averaged G value of each block is denoted by $G_{save}$. The averaged G of all the characteristic blocks, $G_{tave}$, is the average of the G value of each pixel in all the characteristic blocks. The averaged G value of each characteristic block is used to compute the averaged G value of all the characteristic blocks. The reference G parameter is then determined by computing the mean square difference, $\sigma_{ave}^2$, from the averaged G value of all the characteristic blocks, $G_{tave}$, and the averaged G value of each characteristic block, $G_{save}$.

The formula for computing the mean square difference is $$\sigma_{ave}^2 = \sum_{i=1}^{K}(G_{save,i} - G_{tave})^2 / K,$$

where K is the number of blocks with the top 10% averaged G parameters. According to the mean square difference, $\sigma^{ave2}$ and the averaged G value of the characteristic blocks, $G_{tave}$, one can make sure of the reference G parameter.

(a) If $G_{tave} \geq 170$ and $\sigma_{ave}^2 \leq 170$, then $G_{ref} = G_{tave}$;
(b) if $G_{tave} < 170$, then $G_{ref} = \max G_{save}$; and
(c) if $G_{tave} > 170$ and $\sigma_{ave}^2 > 170$, then $G_{ref}$ is the averaged value of the top 5% $G_{save}$.

From these conditions, we obtain the value of the reference G parameter (step 340). If the reference G parameter $G_{ref}$ is greater than a G parameter threshold, the numbers of row and columns are reduced and the division process starts all over again. The threshold range is set to be between 232 and 252. Any number falling within this range is allowed. The threshold in the current embodiment is set to be 242. The system determines whether the reference G parameter is greater than 242 (step 350). From many experiments, we learn that if the reference G parameter is smaller than 242, the division on the image is more appropriate and one does not need to redo the division (step 360). If the reference G parameter is greater than 242, the image has to be divided in another way to obtain a satisfactory reference G parameter. In the current embodiment, the re-division is done by reducing the number of columns by 2 and the number of row by 1 (step 370). This process repeats until the obtained reference G parameter is smaller than 242.

Figure 4:
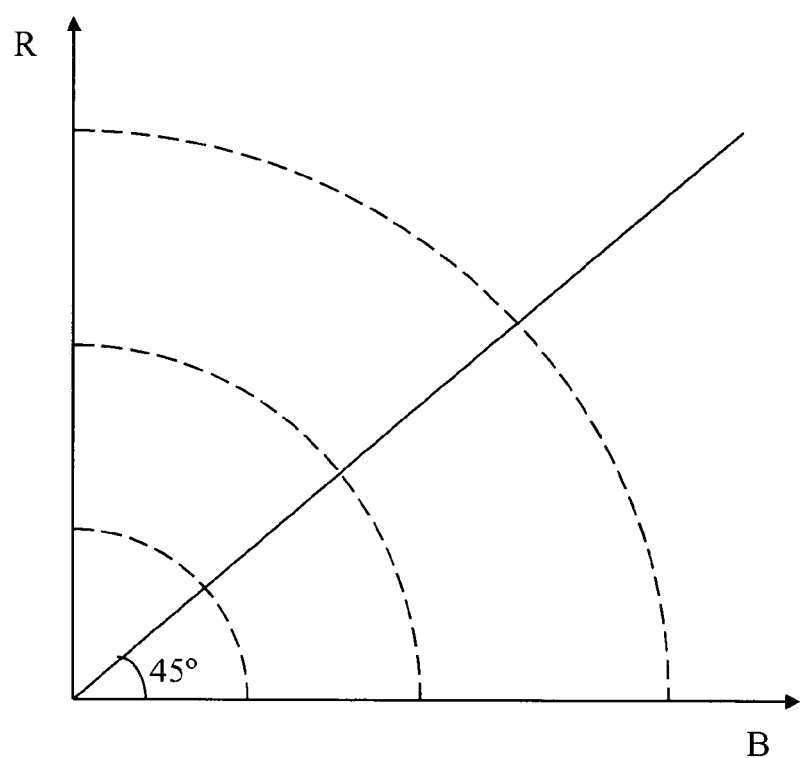
FIG. 4 is a 2D diagram on the R-B plane.

After the image is divided, the division result is used to obtain the R, G, and B values, from which the reference R and B parameters are computed. We know that each pixel corresponds to a set of particular R, G, and B values. These three colors constitute a three-dimensional RBG vector. In the two-dimensional subspace of R and B, the straight line L in FIG. 4 has a slope equal to 1 and subtends with the horizontal axis a 45° angle. We see that the points on the straight line L have the largest probability of being white pixel. Points farther away from the origin also have the highest probability to be white pixel. That is, among all spherical surfaces that intersect with the coordinate system, the points on the surfaces with larger radii are far from the origin and therefore more likely to be white pixel. In summary, the probability of being white pixel is larger for bigger values of $$X = \sqrt{R^2 + B^2}.$$

Figure 5A:
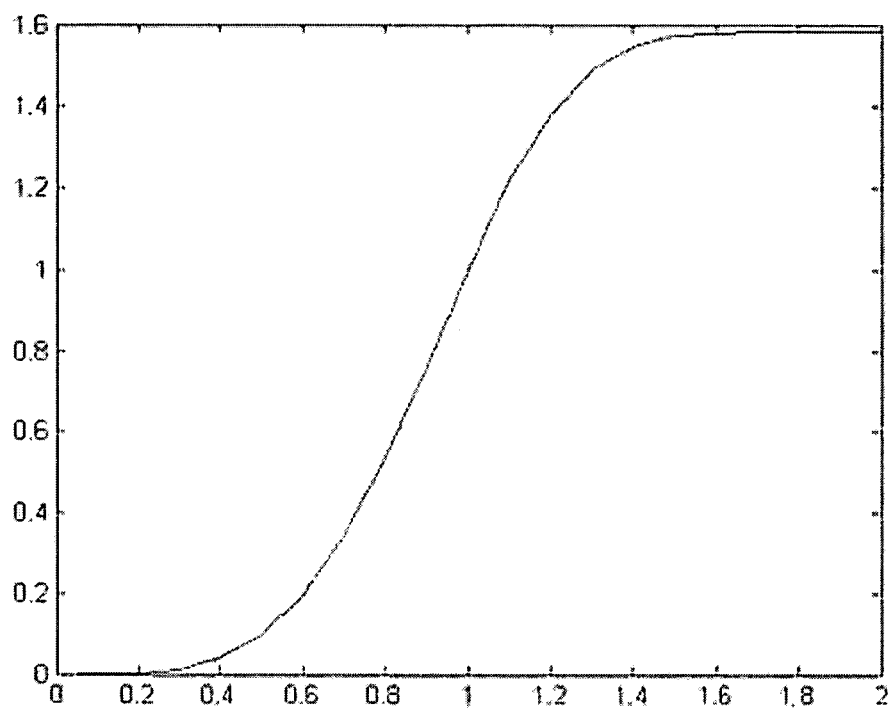
FIGS. 5a and 5b are 2D diagrams showing the idealization distributing of white color.
Figure 5B:
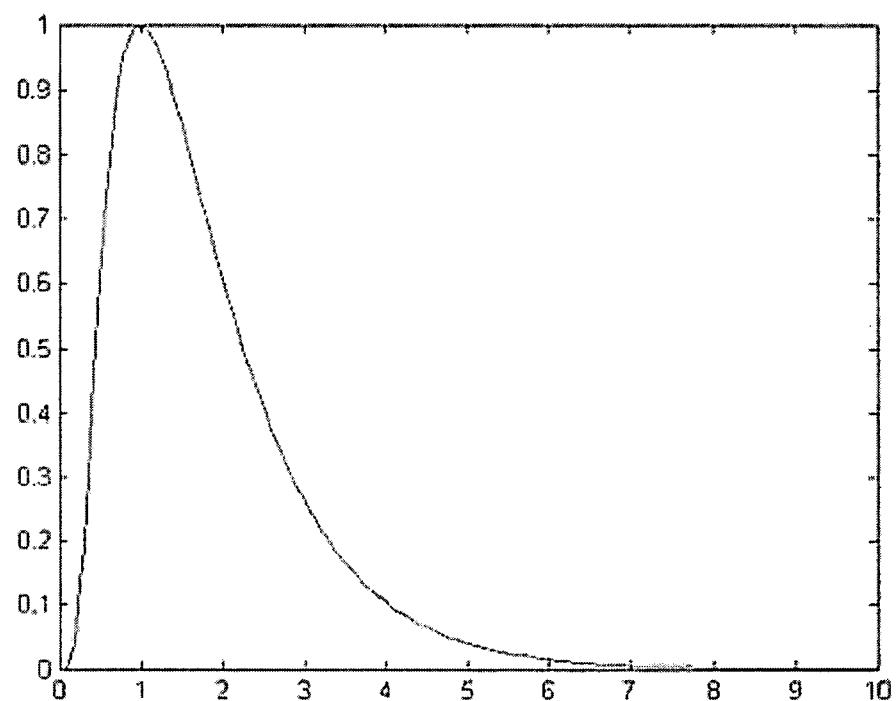

Through the above analysis, we obtain two weights. With reference to FIGS. 5A and 5B, which show idealization distributing of white pixel. In the coordinate system shown in FIG. 5A, the horizontal axis $X = \sqrt{R^2+B^2}$ is and the vertical axis is the weight. From the plot, one sees that the larger X is, the more likely it is a white pixel. From the plot, we also obtain the weight $$W_{1i} = \frac{1}{1-\exp(-1)}(1-\exp(-x_i^4)).$$

Inserting $X = \sqrt{R^2+B^2}$ into the formula for weights, one can obtain the value of the weight $W_{1i}$. At the same time, the closer X=R/B is to 1, the likelihood of being white pixel is also higher. In the coordinate system shown in FIG. 5B, the horizontal axis is X=R/B and the vertical axis is the weight. From this we obtain the weight $W_{2i} = 1/\exp((x_i-1)^2/x_i)$. Inserting X=R/B into the weight formula, one can obtain the value of the weight $W_{2i}$. Since $$R_{ref} = \left(\sum_{i=1}^{K} W_{1i} * W_{2i} * R_{save}\right) \bigg/ \left(\sum_{i=1}^{K} W_{1i} * W_{2i}\right),$$

the reference R parameter $R_{ref}$ can be computed. Likewise, the reference B parameter can be computed using $$B_{ref} = \left(\sum_{i=1}^{K} W_{1i} * W_{2i} * B_{save}\right) \bigg/ \left(\sum_{i=1}^{K} W_{1i} * W_{2i}\right).$$

Finally, the reference R and B parameters are used to compute an R gain, $R_{gain}$, and a B gain, $B_{gain}$, respectively.

Since $R_{gain} = 1.2 + \gamma*(x-1.2)$ and $x = G_{ref}/B_{ref}$ with the reference G parameter and the reference B parameter being known, we can compute the R gain:

(a) if $x \leq 0.8$, then $R_{gain} = 0.8$;
(b) if $0.8 < x < 1.2$, then $\gamma = 1$ (i.e. $R_{gain} = x$);
(c) if $1.8 > x \geq 1.2$, then $\gamma = 1e^{-(x-1.2)}$; and
(d) if $x \geq 1.8$, then $R_{gain} = 1.8$.

Likewise, $B_{gain} = 1.2 + \gamma*(x-1.2)$ and $x = G_{ref}/R_{ref}$ with the reference G parameter and the reference B parameter being known, we can compute the B gain (a) if $x \leq 0.8$, then $B_{gain} = 0.8$;
(b) if $0.8 < x < 1.2$, then $\gamma = 1$ (i.e. $R_{gain} = x$);
(c) if $1.8 > x \geq 1.2$, then $\gamma = 1 - e^{-(x-1.2)}$; and
(d) if $x \geq 1.8$, then $B_{gain} = 1.8$.

After computing the G gain and the B gain, we can perform white balance for the image. An explicit method is to multiply the R and B of each pixel by the corresponding gains. Usually one adjustment is not enough. One needs to check the R gain, $Rg_{k-1}$ and B gain, $Bg_{k-1}$ before the adjustment and those ($Rg_k$ and $Bg_k$) after the adjustment and computes an adjustment parameter. The adjustment parameter is further analyzed to see if it is greater than an adjustment threshold. If it is greater than the adjustment threshold, the image has to be divided all over again in order to compute a new reference G parameter. The threshold is set to be between 0.0015 and 0.0025. If the adjustment parameter falls within the reasonable range, then the disclosed method finishes; otherwise, the image has to be adjusted again. The preferred ending condition is $(Rg_k-Rg_{k-1})^2 + (Bg_k-Bg_{k-1})^2 < 0.002$, where $Rg_k$, $Bg_k$ are the current adjusting R gain and B gain, while $Rg_{k-1}$, $Bg_{k-1}$ are the previous adjusting R gain and B gain.

Certain variations would be apparent to those skilled in the art, which variations are considered within the spirit and scope of the claimed invention.

What is claimed is:

1. A rapid white balance method for processing a color digital image applied to an RGB color space of the image, the method comprising the steps of:
    dividing the image into a plurality of blocks to obtain a reference G parameter, $G_{ref}$;
    obtaining an averaged R value, $R_{savg}$, and an averaged B value, $B_{savg}$, of each of the blocks according to the division;
    computing a reference R parameter, $R_{ref}$, and a reference B parameter, $B_{ref}$, according to the averaged R value and the averaged B value of each block;
    computing a R gain, $R_{gain}$, and a B gain, $B_{gain}$, from the reference R parameter and the reference B parameter; and
    adjusting the image according to the R gain and the B gain.

2. The method of claim 1 further comprising the step of:
    computing an adjustment parameter from the R gain, $Rg_{k-1}$ and the B gain, $Bg_{k-1}$ before the adjustment and the R gain, $Rg_k$ and the B gain, $Bg_k$ after the adjustment; and
    analyzing the adjustment parameter and redoing the image division step if the adjustment parameter is greater than a threshold.

3. The method of claim 1, wherein the image is divided into 40 columns and 30 rows of blocks of equal size.

4. The method of claim 1, wherein the step of dividing the image into a plurality of blocks to obtain a reference G parameter dynamically divides the image into a plurality of blocks following the steps of:
    setting initial numbers of rows and columns;
    dividing the image into a plurality of block according to the initial numbers of rows and columns;
    obtaining the G values of all pixels in each block and computing an averaged G value, $G_{savg}$, for each block from the G values of the pixels;
    selecting a plurality of characteristic blocks form all the blocks according to the averaged G values; and
    computing the reference G parameter according to the averaged G value, $G_{save}$ of each characteristic block.

5. The method of claim 4 further comprising the step of checking the reference G parameter; wherein if the reference G parameter is greater than a G parameter threshold then the numbers of rows and columns are reduced and the procedure starts all over from dividing the image into blocks.

6. The method of claim 4, wherein the step of selecting a plurality of characteristic blocks according to the averaged G value of each block is done by selecting those with top 10% averaged G values.

7. The method of claim 4, wherein the step of computing the reference G parameter according to the averaged G value of each characteristic block comprises the steps of:
    computing the averaged G value of all characteristic blocks according to the averaged G value of each characteristic block;
    computing the mean square difference, $\sigma_{ave}^2$ of the averaged G value, $G_{tave}$ of the characteristic blocks and the averaged G value, $G_{save}$ of each of the characteristic blocks; and
    determining the reference G parameter according to the mean square difference and the averaged G value of the characteristic blocks.

8. The method of claim 7, wherein the mean square difference is computed according to the formula $$\sigma_{ave}^2 = \sum_{i=1}^{K}(G_{save,i} - G_{tave})^2 / K.$$

9. The method of claim 7; wherein the step of determining the reference G parameter according to the mean square difference and the averaged G value of the characteristic blocks uses the following algorithm: if $G_{tave} \geq 170$ and $\sigma_{ave}^2 \leq 170$, then the reference G parameter is equal to the averaged G value, $G_{tave}$ of the characteristic blocks.

10. The method of claim 7, wherein the step of determining the reference G parameter according to the mean square difference and the averaged G value of the characteristic blocks uses the following algorithm: if $G_{tave} < 170$, then the reference G parameter is the maximum averaged G value, $G_{save}$.

11. The method of claim 7, wherein the step of determining the reference G parameter according to the mean square difference and the averaged G value of the characteristic blocks uses the following algorithm: if $G_{tave} > 170$ and $\sigma_{ave}^2 > 170$, then the reference G parameter is the averaged value of the top 5% $G_{save}$.

12. The method of claim 5, wherein the reference G parameter threshold is between 232 and 252.

13. The method of claim 1, wherein the step of obtaining the averaged R value and the averaged B value of each block according to the division further comprises the steps of:
    obtaining the R value and the B value of each pixel using a sensor; and
    using the R value and the B value of each pixel to compute an averaged R value, $R_{savg}$, and an averaged B value, $B_{savg}$, for each block.

14. The method of claim 1, wherein for the step of using the averaged R value and the averaged B value of each block to compute the reference R parameter and the reference B parameter of the image,
    the reference R parameter in is computed using the formula $$R_{ref} = \left(\sum_{i=1}^{K} W_{1i} * W_{2i} * R_{save}\right) / \left(\sum_{i=1}^{K} W_{1i} * W_{2i}\right),$$

where the weight $$W_{1i} = \frac{1}{1-\exp(-1)}(1-\exp(-x_i^4))$$

with $x=\sqrt{R^2+B^2}$ and the weight $W_{2i}=1/\exp((x_i-1)^2 x_i)$ with $x=R/B$; and the reference B parameter in the step is computed using the formula $$B_{ref} = \left(\sum_{i=1}^{K} W_{1i} * W_{2i} * B_{save}\right) / \left(\sum_{i=1}^{K} W_{1i} * W_{2i}\right),$$

where the weight $$W_{1i} = \frac{1}{1-\exp(-1)}(1-\exp(-x_i^4))$$

with $x=\sqrt{R^2+B^2}$ and the weight $W_{2i}=1/\exp((x_i-1)^2/x_i)$ with $x=R/B$.

15. The method of claim 1, wherein
the R gain is computed according to the reference R parameter using the formula $R_{gain}=1.2+\gamma*(x-1.2)$, where $x=G_{ref}/B_{ref}$; and
the B gain is computed according to the reference B parameter using the formula $B_{gain}=1.2+\gamma*(x-1.2)$, where $x=G_{ref}/R_{ref}$.

16. The method of claim 15, wherein for the formula $1.2+\gamma*(x-1.2)$
if $x \leq 0.8$, then the gain is 0.8;
if $0.8 < x < 1.2$, then $\gamma=1$ (i.e., the gain is equal to x);
if $1.8 > x \geq 1.2$, then $\gamma=1-e^{-(x-1.2)}$; and
if $x \geq 1.8$, then the gain is 1.8.

17. The method of claim 1, wherein the image adjustment is done by multiplying the R and B values of each pixel in the image by the R gain and the B gain.

18. The method of claim 2, wherein the adjustment parameter is computed using the formula $(Rg_k-Rg_{k-1})^2+(Bg_k-Bg_{k-1})^2$.

19. The method of claim 2, wherein the adjustment threshold is between 0.0015 and 0.0025.

* * * * *